(12) United States Patent
Benn

(10) Patent No.: US 11,281,716 B2
(45) Date of Patent: Mar. 22, 2022

(54) APPARATUS, SYSTEMS AND METHODS FOR MEDIA CONTENT SEARCHING

(71) Applicant: Dish Technologies L.L.C., Englewood, CO (US)

(72) Inventor: Mala Benn, Skipton (GB)

(73) Assignee: DISH TECHNOLOGIES L.L.C., Englewood, CO (US)

(*) Notice: Subject to any disclaimer, the term of this patent is extended or adjusted under 35 U.S.C. 154(b) by 1503 days.

(21) Appl. No.: 14/445,852

(22) Filed: Jul. 29, 2014

(65) Prior Publication Data

US 2016/0037227 A1    Feb. 4, 2016

(51) Int. Cl.
*G06F 16/73* (2019.01)
*G06F 16/738* (2019.01)
(Continued)

(52) U.S. Cl.
CPC .......... *G06F 16/739* (2019.01); *G06F 16/435* (2019.01); *G06F 16/48* (2019.01);
(Continued)

(58) Field of Classification Search
CPC .......... G06F 17/3082; G06F 17/30038; G06F 17/30026; G06F 17/30867; G06F 17/30017; G06F 17/30053; G06F 17/30646; G06F 17/30743; G06F 17/30752; G06F 17/30784; G06F 17/30787; G06F 17/3002; G06F 17/30899; G06F 17/30522; G06F 17/30864; G06F 17/30265; G06F 17/30861; G06F 17/30247; G06F 17/30528; G06F 17/30557; G06F 17/30203; G06F 17/3056; G06F 17/3028; G06F 17/30551; G06F 17/30716; G06F 17/30958; G06F 17/2775;
(Continued)

(56) References Cited

U.S. PATENT DOCUMENTS 9,367,609 B1 *   6/2016  Mianji ............... G06F 16/2428
2008/0022308 A1 * 1/2008  Garcea .................. H04N 21/84
                                                          725/46
(Continued)

OTHER PUBLICATIONS

"Video Stream Labeling and Embedded Tagging Methodology", ip.com Journal, ip.com Inc., West Henreietta, NY, US, Mar. 12, 2013 (Mar. 12, 2013), XP013156341, ISSN: 1533-0001.

*Primary Examiner* — Alford W Kindred
*Assistant Examiner* — Cecile H Vo
(74) *Attorney, Agent, or Firm* — Perkins Coie LLP

(57) ABSTRACT

Media device systems and methods are operable to identify media content events. An exemplary embodiment receives a user defined keyword tag, associates an identifier of a media content event with the user defined keyword tag, stores the user defined keyword tag and the associated identifier in a database, receives a user specification of the user defined keyword tag, conducts a search of the user defined keyword tags in the database for instances where the user defined keyword tag of the second user specification matches with the stored user defined keyword tag of the first user specification, and generates a return message that indicates the associated identifier of the media content event for each instance where the user defined keyword tag matches with the stored user defined keyword tag.

11 Claims, 4 Drawing Sheets

(51) Int. Cl.
*H04N 21/8405* (2011.01)
*H04N 21/482* (2011.01)
*H04N 21/472* (2011.01)
*H04N 21/433* (2011.01)
*H04N 21/462* (2011.01)
*H04N 21/475* (2011.01)
*H04N 21/4788* (2011.01)
*G06F 16/48* (2019.01)
*G06F 16/435* (2019.01)
G06F 16/43 (2019.01)
H04N 21/858 (2011.01)

(52) U.S. Cl.
CPC ..... *H04N 21/4334* (2013.01); *H04N 21/4622* (2013.01); *H04N 21/4755* (2013.01); *H04N 21/4756* (2013.01); *H04N 21/4788* (2013.01); *H04N 21/47202* (2013.01); *H04N 21/4821* (2013.01); *H04N 21/8405* (2013.01); *H04N 21/858* (2013.01)

(58) Field of Classification Search
CPC ............... G06F 17/30; G06F 17/30029; G06F 17/30044; G06F 17/30067; G06F 17/30091; G06F 17/30182; G06F 17/30194; G06F 17/30233; G06F 17/30268; G06F 17/30554; G06F 17/30572; G06F 17/30598; G06F 17/30917; G06F 16/954; G06F 16/248; G06F 16/738; G06F 16/9535; G06F 16/435; G06F 16/48; G06F 16/739; H04N 21/4821; H04N 21/4622; H04N 5/445; H04N 2005/441; H04N 21/4334; H04N 21/47202; H04N 21/4828; H04N 21/4755; H04N 21/8405; H04N 21/858
USPC ......... 707/736, 758, 769, E17.009, E17.022, 707/722, 822, E17.014, 999.003, E17.019, 707/914, 915, 916, 999.102, 999.107, 707/999.201, 737, E17.005, 634, 754; 715/202, 744, 716, 719, 728, 762; 725/44, 39, 47
See application file for complete search history.

(56) References Cited

U.S. PATENT DOCUMENTS

| | | | | |
|---|---|---|---|---|
| 2010/0287197 | A1* | 11/2010 | Wang | G06F 16/958 707/769 |
| 2011/0208722 | A1* | 8/2011 | Hannuksela | G06F 16/489 707/723 |
| 2012/0030263 | A1 | 2/2012 | John et al. | |
| 2012/0124475 | A1* | 5/2012 | Foote | H04N 21/812 715/719 |
| 2012/0159550 | A1* | 6/2012 | Bajpai | H04N 21/4622 725/44 |
| 2013/0111527 | A1* | 5/2013 | Poniatowski | G06F 16/955 725/58 |
| 2013/0173533 | A1* | 7/2013 | Nichols | G06F 16/437 707/609 |
| 2014/0075310 | A1* | 3/2014 | Li | G11B 27/034 715/716 |

* cited by examiner

APPARATUS, SYSTEMS AND METHODS FOR MEDIA CONTENT SEARCHING

BACKGROUND

Media devices, such as a set top box, or the like, are configured to receive media content from a content provider. The media content is typically provided as a stream of information. The streaming media content provides a series of media content events, such as movies, sporting events, television series, newscast programs, etc.

At times, the user may be interested in identifying a particular media content event of interest. A search application of the media device permits the user to search for the particular media content event of interest by title, actor and/or other information. The search application searches electronic program guide (EPG) information and/or video on demand (VOD) information residing in a memory of the media device. Alternatively, or additionally, the search application may search a remote server.

However, such searching is limited to a search of predefined information that is available to the search application. Typically, the searchable predefined information is provided by the content producer, the content provider, and/or a third party associated with production and/or management of the content.

Accordingly, there is a need in the arts to provide a system and method for enhanced user search capabilities. Such enhanced search capabilities would permit the user to identify and/or access particular media content events of particular interest to them that might not otherwise be identified by legacy search applications.

SUMMARY

Systems and methods of identifying media content events are disclosed. An exemplary embodiment receives a user defined keyword tag, associates an identifier of a media content event with the user defined keyword tag, stores the user defined keyword tag and the associated identifier in a database, receives a user specification of the user defined keyword tag, conducts a search of the user defined keyword tags in the database for instances where the user defined keyword tag of the second user specification matches with the stored user defined keyword tag of the first user specification, and generates a return message that indicates the associated identifier of the media content event for each instance where the user defined keyword tag matches with the stored user defined keyword tag.

BRIEF DESCRIPTION OF THE DRAWINGS

Preferred and alternative embodiments are described in detail below with reference to the following drawings.

DETAILED DESCRIPTION

Figure 1:
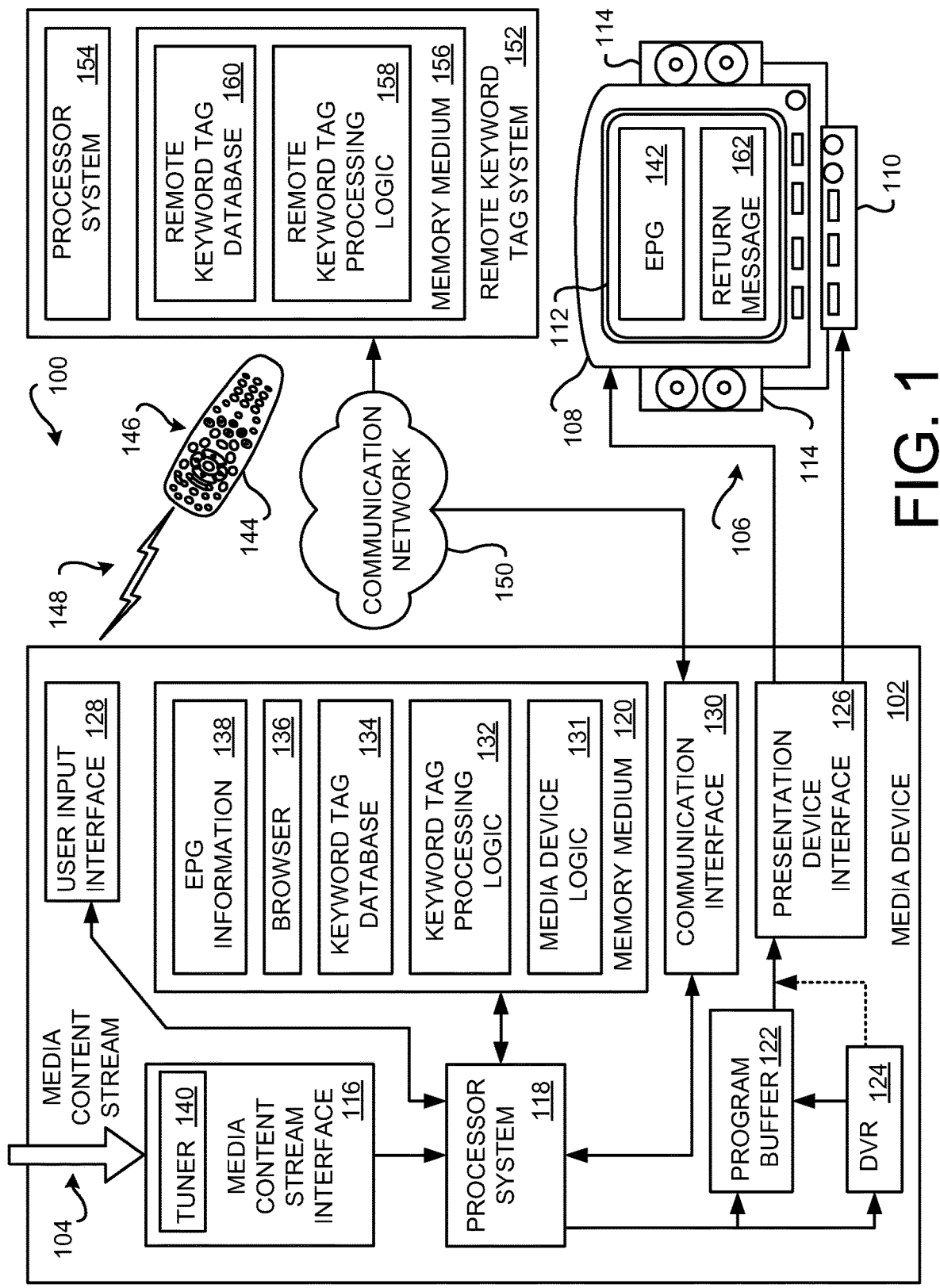
FIG. 1 is a block diagram of an embodiment of a user keyword tag search application implemented in a media device, such as, but not limited to, a set top box (STB)

FIG. 1 is a block diagram of an embodiment of a user keyword tag search application 100 implemented in a media device 102, such as, but not limited to, a set top box (STB). Embodiments of the user keyword tag search application 100 may be implemented in other media devices, such as, but not limited to, stereos, surround-sound receivers, radios, televisions (TVs), digital video disc (DVD) players, digital video recorders (DVRs), cellular phones equipped with video functionality, smart phones, tablets, personal device assistants (PDAs), game playing devices, or personal computers (PCs) that are configured to present a video-based media content event that is received in a media content stream 104. Accordingly, a media device is defined herein to be an electronic device that is configured to receive video-based media content event in a media content stream 104 that is presentable to a user.

The user tag search application 100 provides enhanced search capabilities that permit the user to identify and/or access particular media content events of interest based on a previously defined keyword tag that has been associated with the particular media content event of interest. A user defined keyword tag is a term or phrase selected by the user that is used to conduct a search in a database or the like. The previously user defined keyword tag may have been defined by the user of the media device or by another user using a different media device or electronic device. In some embodiments, keyword tags may be defined by by the content producer, the content provider, and/or a third party associated with production and/or management of the content. In an example embodiment, the title of the media content event, one or more of the individual key words in the title, and/or all individual words of the title, are defined as keyword tags.

Keyword tags may be defined by the user at any convenient time. In some situations, the user may be watching the media content event, and realize that a particular keyword tag would be appropriate for identifying that media content event. The user, while watching the media content event could define the keyword tag. In some embodiments, the user may specify the title of the media content event and an associated keyword tag. Here, the user does not need to be currently watching the media content event.

In operation, an initial user specification of a user defined keyword tag is received. An identifier of a media content event is associated with the user defined keyword tag. The initially received user defined keyword tag and the associated identifier of the media content event are stored in a database that includes a plurality of keyword tags and associated identifiers of media content events. A subsequent user specification of the user defined keyword tag is received by the user tag search application 100. The user tag search application 100 conducts a search of information in the database for instances where the subsequent user specification matches with at least one stored user defined keyword tag. Then, a return message is generated and presented to the user, wherein the return message indicates the associated identifier of the media content event for each instance where the subsequent user specification matches with at least one stored user defined keyword tag.

For example, a previously user defined keyword tag of "#seabass" may have been associated with a particular media content event of interest entitled "Joe's Southern Cooking" that the user had previously viewed. Here, this particular media content event of interest had a segment related to a recipe for preparing and cooking sea bass. The user, or another person, may have had an interest in later accessing this particular media content event of interest so that they might review the sea bass cooking segment. Alternatively, or additionally, the user or other person may have realized that other people might also be interested in locating and viewing the segment related to a recipe for preparing and cooking sea bass presented in the particular media content event of interest.

Accordingly, the user defined keyword tag is associated by the user, or by another user, with an identifier of the particular media content event of interest. The identifier may be a title, program identifier, serial number or other identifier that uniquely identified the associated media content event. This user defined keyword tag and the associated identifier of the media content event are saved by the user keyword tag search application 100 to facilitate searching by the user or by other people. In the above-described simplified example, the particular media content event of interest entitled "Joe's Southern Cooking" is associated with the user defined keyword tag of "#seabass" by embodiments of the user keyword tag search application 100. Then, at a later time, the user or another person could identify and/or access this particular media content event of interest by having the user keyword tag search application 100 perform a search based on the previously user defined keyword tag of "#seabass."

Any suitable form of a user defined keyword tag may be used in the various embodiments. In the simplified example above, the well known hash tag term "#seabass" was used as the user defined keyword tag, wherein the use of a hash mark (#) was an indicator to the user, other people, and the user keyword tag search application 100 that the following text string was intended to be a searchable identifier (interchangeably referred to herein as a "keyword tag" or as a "hash tag").

In some embodiments, a hash mark ("#") precedes the user defined keyword tag, which may be a term, a phrase or a unique alphanumeric string. The preceding hash mark indicates to the user keyword tag search application 100 that a search based on the user defined keyword tag is to be performed. Also, the preceding hash mark intuitively informs the user that the keyword tag will be associated with at least one media content event of interest and/or that a search will be conducted using the following keyword tag. Alternatively, or additionally, another suitable symbol preceding the keyword tag may be used. Alternatively, or additionally, the preceding symbol may be omitted in situations where the user keyword tag search application 100 is configured to, and/or where the user intuitively understand that, the user defined keyword tag will be associated with at least one media content event of interest and/or that a search will be conducted using the keyword tag.

The exemplary media device 102 is communicatively coupled to a media presentation system 106 that includes a visual display device 108, such as a television (hereafter, generically a TV), and an audio presentation device 110, such as a surround sound receiver controlling an audio reproduction device (hereafter, generically, a speaker). In this simplified embodiment, the presentation device interface 126 is illustrated as coupled to the visual display device 108 and the audio presentation device 110. Other types of output devices may also be coupled to the media device 102, including those providing any sort of stimuli sensible by a human being, such as temperature, vibration and the like.

The video portion of the media content event is displayed on the display 112 and the audio portion of the media content event is reproduced as sounds by one or more speakers 114. In some embodiments, the media device 102 and one or more of the components of the media presentation system 106 may be integrated into a single electronic device.

The non-limiting exemplary media device 102 comprises a media content stream interface 116, a processor system 118, a memory medium 120, a program buffer 122, an optional digital video recorder (DVR) 124, a presentation device interface 126, a user input interface 128, and an optional communication interface 130. The memory medium 120 comprises portions for storing the media device logic 131, the keyword tag processing logic 132, the keyword tag database 134, an optional browser 136, and the electronic program guide (EPG) information 138. In some embodiments, the media device logic 131, the keyword tag processing logic 132 and/or the browser 136 may be integrated together, and/or may be integrated with other logic. In other embodiments, some or all of these memory and other data manipulation functions may be provided by and using remote server or other electronic devices suitably connected via the Internet or otherwise to a client device. Other media devices 102 may include some, or may omit some, of the above-described media processing components. Further, additional components not described herein may be included in alternative embodiments.

The functionality of the media device 102, here a set top box, is now broadly described. A media content provider provides media content that is received in one or more multiple media content streams 104 multiplexed together in one or more transport channels. The transport channels with the media content streams 104 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 104 can be received from one or more different sources, such as, but not limited to, a cable system, a radio frequency (RF) communication system, or the Internet.

The one or more media content streams 104 are received by the media content stream interface 116. One or more optional tuners 140 in the media content stream interface 116 selectively tune to one of the media content streams 104 in accordance with instructions received from the processor system 118. The processor system 118, executing the media device logic 131 and based upon a request for a media content event of interest specified by a user, parses out media content associated with the media content event of interest. The media content event of interest is then assembled into a stream of video and/or audio information which may be stored by the program buffer 122 such that the media content can be streamed out to components of the media presentation system 106, such as the visual display device 108 and/or the audio presentation device 110, via the presentation device interface 126. Alternatively, or additionally, the parsed out media content may be saved (recorded) into the DVR 124 for later presentation. The DVR 124 may be directly provided in, locally connected to, or remotely connected to, the media device 102. In alternative embodiments, the media content streams 104 may be stored for later decompression, processing and/or decryption.

From time to time, information populating the EPG information 138 portion of the memory medium 120 is communicated to the media device 102, via the media content stream 104 or via another suitable media. The EPG information 138 portion of the memory medium 120 stores the information pertaining to the scheduled programming for a plurality of media content events that are scheduled to be received at the media content stream interface at a current time and at future times. The information may include, but is not limited to, a scheduled presentation start and/or end time, a program channel, and descriptive information for each scheduled media content event. The program's descriptive information may include the title of the program, names of performers or actors, date of creation, and a summary describing the nature of the program. Any suitable information may be included in the program's supplemental information. Upon receipt of a command from the user requesting presentation of an EPG display, the information in the EPG information 138 is retrieved, formatted, and then presented on the display 112 as an EPG 142.

The exemplary media device 102 is configured to receive commands from a user via a remote control 144. The remote control 144 includes one or more controllers 146. The user, by actuating one or more of the controllers 146, causes the remote control 144 to generate and transmit commands, via a wireless signal 148, to the media system 102. The commands control the media device 102 and/or control the media presentation devices 106. The wireless signal 148 may be an infrared (IR) signal or a radio frequency (RF) signal that is detectable by the user input interface 128. The user input interface 128 may alternatively, or additionally, be configured to receive user input from one or more of a key board, a gaming console, a smart phone or another user input device.

In embodiments of the media device 102 that include the optional communication interface 130, the media device 102 may communicatively couple to a communication network 150. Accordingly, embodiments of the media device 102 may establish a communication link to a remote keyword tag server 152, via the communication network 150.

The remote keyword tag server 152 may be configured as a server device or other cloud-based electronic device or system. An embodiment of the remote keyword tag server 152 comprises a processor system 154 and memory medium 156. The remote keyword tag processing logic 158 and a remote keyword tag database 160 reside in memory medium 156. In some embodiments, the remote keyword tag server 152 employs a distributed architecture. For example, but not limited to, the remote keyword tag server 152 may comprise a plurality of electronic devices remotely located from each other. In some embodiments, the remote keyword tag processing logic 158 and the remote keyword tag database 160 may be in separate electronic devices and/or may be distributed across multiple electronic devices. Further, the remote keyword tag processing logic 158 and the remote keyword tag database 160 of the remote keyword tag server 152 may be different from the keyword tag processing logic 132 and the keyword tag database 134 residing in the media device 102.

Communication network 150 is illustrated as a generic communication system that communicatively couples the remote keyword tag server 152 and a plurality of media devices and other electronic devices (not shown). In the various embodiments, the communication network 150 may be a telephony system, a cellular telephone system, a radio frequency (RF) wireless system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

The processes performed by the media device 102 relating to the processing of the received media content stream 104 and communication of a presentable media content event to the components of the media presentation system 106 are generally implemented by the processor system 118 while executing the media device logic 131. Thus, the media device 102 may perform a variety of functions related to the processing and presentation of one or more media content events received in the media content stream 104.

In the various embodiments, after a keyword search has been conducted by the user, a suitable return message 162 is generated by the user keyword tag search application 100 and is then presented on the display 112 to the user indicating identified media content events. For example, but not limited to, the title of an identified media content event may be indicated in the return message 162. Also, the user defined keyword tag(s) that the search was based upon may be indicated in the return message 162. Any information of interest may be included on a presented return message 162.

Figure 2:
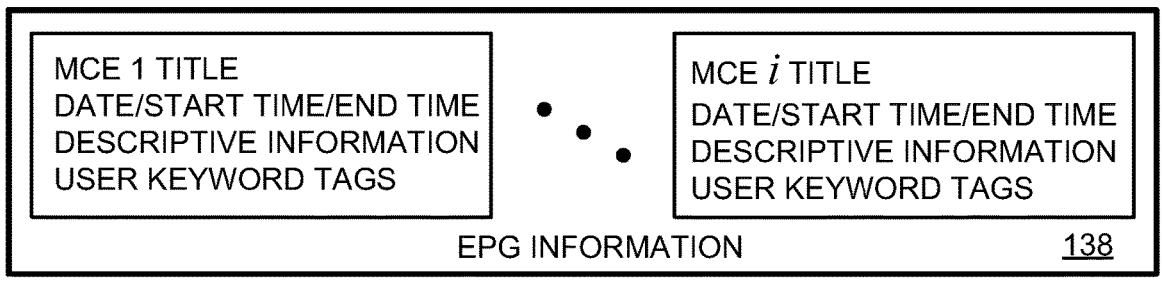
FIG. 2 is a block diagram illustrating in greater detail examples of the keyword tag database, the electronic program guide (EPG) information, and the digital video recorder (DVR) implemented in the media device.
Figure 2:
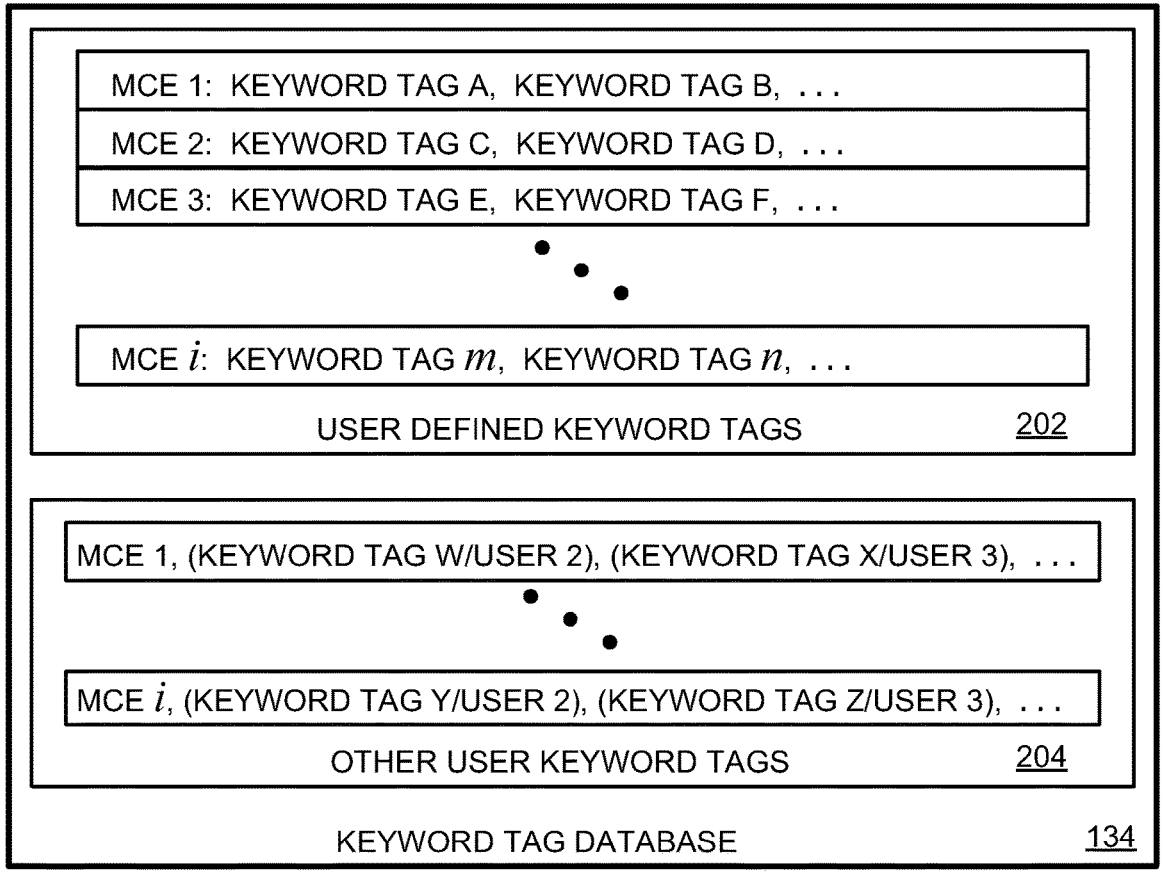
Figure 2:
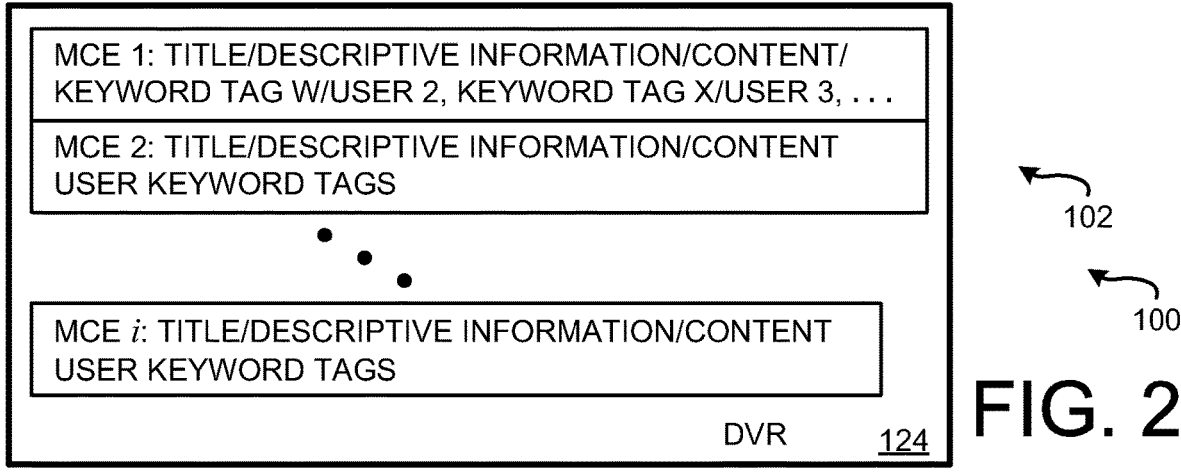

FIG. 2 is a block diagram illustrating in greater detail examples of the keyword tag database 134, the EPG information 138, and the DVR 124 implemented in the media device 102. The keyword tag database 134 includes a portion for storing a listing of keyword tags defined by the user of the media device 102, denoted as the user defined keyword tags 202 in FIG. 2, and the identifier of an associated media content event. In some embodiments, an optional portion for storing a listing of keyword tags and identifiers of associated media content events may be defined by other users, denoted as the other user keyword tags 204 in FIG. 2.

At some point in time while using the media device 102, the user defines one or more keyword tags for a particular media content event of interest. The one or more keyword tags for each particular media content event of interest are then stored into the user defined keyword tags 202 portion of the keyword tag database 134. In the non-limiting example keyword tag database 134 illustrated in FIG. 2, the user (interchangeably identified as "user 1" herein) has defined at least two keyword tags (keyword tag A and keyword tag B) that are associated with a first media content event of interest (identified as "MCE 1" hereinafter). Additionally, or alternatively, the user has defined at least two keyword tags (keyword tag C and keyword tag D) that are associated with a second media content event of interest (identified as "MCE 2" hereinafter) and has defined at least two more keyword tags (keyword tag E and keyword tag F) that are associated with a first media content event of interest (identified as "MCE 3" hereinafter). The user may define one or more keyword tags for as many different media content events of interest as the user wishes. For example, the user has defined at least two keyword tags (keyword tag m and keyword tag n, wherein the "m" and the "n" indicate variable numbers representing user defined keyword tags) that are associated with another media content event of interest (identified as "MCE i" hereinafter, wherein the "i" indicates a variable number for the last one of the media content event of interest having keyword tags stored in the listing of the user defined keyword tags 202 portion of the keyword tag database 134).

In the various embodiments, the user may define one, two, or more keyword tags for any particular media content event of interest. Accordingly, when the user of the media device wishes to conduct a search for media content events that are associated with particular keyword tags, the user inputs one or more keyword tags into the user keyword tag search application 100. The user keyword tag search application 100 then conducts a search of the user defined keyword tags 202 to identify one or more media content events that have been associated with the specified one or more keyword tags.

For example, the user may specify "keyword tag B" as an input to the user keyword tag search application 100. The user keyword tag search application 100 would then identify instances of the searched keyword tag B, which would be associated with the identifier of the media content event MCE 1 (since MCE 1 is associated with the keyword tag B). A suitable return message 162 would be returned to the user indicating the identifier of the associated media content event MCE 1. For example, the return message 162 may be presented as a pop-up window on the display 112 (FIG. 1) showing the title of MCE 1. Accordingly, a single keyword tag may be used to identify an associated media content event of interest.

As another non-limiting example, the user may specify two or more keyword tags for searching by the user keyword tag search application 100. For example, the user may specify "keyword tag C" and "keyword tag D" as inputs to the user keyword tag search application 100. The user keyword tag search application 100 would then identify the media content event MCE 2 (since MCE 2 is associated with the keyword tag C and the keyword tag D). As yet another non-limiting example, the user may specify "keyword tag B" and "keyword tag C" as inputs to the user keyword tag search application 100. The user keyword tag search application 100 would then identify the media content events MCE 1 and MCE 2 (since MCE 1 is associated with the keyword tag B and MCE 2 is associated with the keyword tag C). Accordingly, a plurality of keyword tags may be used to identify one or more media content events of interest.

Further, the same user defined keyword tag may be associated with multiple media content events of interest. For example, the keyword tag A has been associated with media content events MCE 1 and MCE 3. The user may specify "keyword tag A" as an input to the user keyword tag search application 100. The user keyword tag search application 100 would then identify the media content events MCE 1 and MCE 3 (since both MCE 1 and MCE 3 are associated with the keyword tag A). Accordingly, a single keyword tag may be used to identify a plurality of different media content events of interest.

Keyword tags defined by other users (and the identifier of the associated media content event) may also be included in the keyword tag database 134. The other user keyword tags 204 portion of the keyword tag database 134 contains keyword tags that other users have defined using their media devices (not shown). When another user defines one or more keyword tags for a particular media content event of interest, the defined keyword tags and the identifying information of the associated media content event is communicated to the remote keyword tag server 152, via the communication network 150 (FIG. 1).

The user defined keyword tags 202 and the other user keyword tags 204 portion of the keyword tag database 134, and the EPG information 138, are illustrated as separate portions of memory medium 120. In other embodiments, the user defined keyword tags 202, the other user keyword tags 204 and/or the EPG information 138 may be integrated together and/or with other data.

When the media device 102 is communicatively coupled to the remote keyword tag server 152 via a communication link, the keyword tags and the identifying information of the associated media content event defined by the other users are communicated from the remote keyword tag server 152 to the media device 102, and are stored into the other user keyword tags 204 portion of the keyword tag database 134. alternatively, or additionally, the keyword tags and the identifying information of the associated media content event defined by the other users may be communicated from the other user's media devices and/or electronic device to the media device 102. Accordingly, if the user of the media device knows or can intuitively ascertain a keyword tag defined by another user, the user of the media device 102 can have the user keyword tag search application 100 conduct a search based on the other person's defined keyword tags.

For example, the user 2 has defined keyword tag W and has associated that keyword tag with the media content event MCE 1. Additionally, or alternatively, user 2 has defined the keyword tag Y and has associated that keyword tag with the media content event of interest MCE 1. User 3 has defined the keyword tag X with the media content event MCE 1 and has defined the keyword tag Z with the media content event MCE 1.

In the various embodiments, the user defined keyword tags 202 and the other user keyword tags 204 portion may be implemented using any suitable relational database or other database format. When a search is conducted by embodiments of the user keyword tag search application 100, one or more user specified keyword tags are compared with stored keyword tags in the keyword tag database 134. When a match is identified between the user specified keyword tag and a stored keyword tag in the keyword tag database 134, the associated identity information of the media content event may be retrieved using the matched keyword tag in the keyword tag database 134. The identity information of the media content event may then be used for a variety of purposes, such as for presentation in a suitable return message 162, communication to another electronic device, for defining an automatic operation performed by the media device 102, or the like.

In the various embodiments, a suitable return message 162 is presented on the display 112 (FIG. 1) to the user indicating identified media content events after a search has been conducted by the user keyword tag search application 100. For example, the user of the media device 102 may specify "keyword tag W" as an input to the user keyword tag search application 100. The user keyword tag search application 100 would then identify the media content event MCE 1 (since MCE 1 is associated with the keyword tag W defined by user 2). A suitable return message 162 may be presented to the user on the display 112 indicating the identifier of the media content event MCE 1, and optionally, indicate the identify of user 2. For example, the return message 162 may be presented as a pop-up window on the display 112 (FIG. 1) showing the title of MCE 1 and the identity of user 2. For example, the other user's name, nickname, user handle, or the like may be presented to the user of the media device 102. Accordingly, a single keyword tag may be used to identify an associated media content event of interest that has been tagged by other users.

Additionally, or alternatively, if the identified media content event is scheduled for presentation at a future date and/or time, the scheduled presentation information may be included in the return message 162. Since the identifier of the associated media content event has been determined from the search based on the specified keyword tag, the identifier of the associated media content event may be used to identify the presentation scheduled of the identified media content event based on the information residing in the EPG information 138 (FIG. 1).

Additionally, or alternatively, if the identified media content event is available from a secondary source, information about the availability of the identified media content event may be included on the presented return message 162. For example, but not limited to, the identified media content event may be available on a video on demand (VOD) system that is remote from the media device 102. The return message 162 may indicate availability of the identified media content event, and any associated access fees, to the user. As another example, the identified media content event may have been previously stored in the DVR 124. The return message 162 may then indicate that the identified media content event is available from the DVR 124. As yet another example, the identified media content event may be available from a web site server (not shown) or the like. The return message 162 may indicate information to the user that would enable the user to then access the identified media content event from the web site server or the like.

Additionally, or alternatively, the user keyword tag search application 100 may configure the media device to perform one or more automatic operations. For example, if a media content event of interest has been identified that is of interest to the user, the user keyword tag search application 100 may configure the media device to record that particular media content event of interest into the DVR 124 or another memory medium when it becomes available in the media content stream 104 (FIG. 1). Since the identifier of the associated media content event has been determined from the search based on the specified keyword tag, the identifier of the associated media content event may be used to identify the presentation scheduled of the identified media content event based on the information residing in the EPG information 138 (FIG. 1). The presentation schedule information may then be used to set recording timers or the like for the recording of the identified media content event. In some embodiments, a user confirmation process may be required before the identified media content event of interest is scheduled for recording. For example, but not limited to, a password and/or user name may be required before a scheduled recording is defined by the media device 102. In an example embodiment, the requirement of the user confirmation process may be made if a parental rating of the identified media content event exceeds some predefined threshold and/or if the rating is identified as being restricted by a parental control system (not shown) of the media device 102.

Additionally, or alternatively, the user keyword tag search application 100 may automatically access the identified media content event of interest from a VOD system or the like. If payment is required for access to the identified media content event of interest, a user confirmation process may be required to authorize access to the identified media content event of interest before it is retrieved and presented to the user. For example, but not limited to, a password, a user name, and/or payment information may be required before a scheduled recording is defined by the media device 102.

In some embodiments, user defined keyword tags defined by the user and/or other users may be made available in alternative forms. In an example embodiment, user defined keyword tags defined by the user and/or other users is included in the EPG information that is stored in the EPG information 138 portion of memory medium 156 (FIG. 1). Here, the EPG information includes the title of media content events that are scheduled for presentation (that is, scheduled for delivery in the media content stream 104) along with the scheduled presentation dates and times. The EPG information also includes descriptive information about each scheduled media content event. In such embodiments, a list of keyword tags, and optionally the identity of the users who defined the keyword tags, may be included as part of the EPG information.

Additionally, or alternatively, the user keyword tag search application 100 may append or add the keyword tags (and optionally any user identities) into the EPG information. When the EPG 142 (FIG. 1) is presented to the user, the keyword tags (and optionally the user identities) may be included on the presented EPG 142.

Additionally, or alternatively, information for the keyword tags (and optionally the user identities) may be provided by the remote keyword tag server 152 to an entity that is preparing EPG information updates. The entity that prepares EPG information updates can then incorporate the received keyword tags (and optionally the user identities) into EPG information for those particular media content events that are scheduled into the current EPG update. In such embodiments, the entity may maintain its own data base of keyword tags (and optionally the user identities). Accordingly, keyword tags (and optionally the user identities) may be received from different electronic devices and/or may be manually entered by an operator or the like. For example, the media device 102 may communicate keyword tags defined by its user to the entity that prepares EPG information updates.

For example, the EPG information for the media content event MCE 1 includes the title, the scheduled presentation date, the scheduled start time and end time, and descriptive information. The EPG information for the media content event MCE 1 may also include previously defined user keyword tags (and optionally, includes the identities of the users who defined the keyword tags). Thus, when the user conducts a search for a particular keyword tag(s), the user keyword tag search application 100 may search the keyword tags of the EPG information 138 to identify any media content events that have been associated with the searched keyword tag(s).

In some situations, information pertaining to user defined keyword tags received by the remote keyword tag server 152 may be used of other purposes. For example, but not limited to, the keyword tags may be communicated to the entity that prepares programming and scheduling of particular media content events. Alternatively, or additionally, statistics pertaining to the keyword tags may be provided. For example, but not limited to, a number of keyword tags, number of users providing keyword tags, and/or trending information may be provided. The entity may then make adjustments to their programming schedule. For example, if MCE 1 has become associated with a relatively large number of different user defined keyword tags, has become associated by a relatively large number of users, and/or if trending information indicates an increasing interest in MCE 1, the entity may adjust the programming schedule so that MCE 1 is broadcast sooner and/or with increasing frequency, and/or may make MCE 1 available on a VOD system.

In some embodiments, a media content event may include previously defined user keyword tags (and optionally, may include the identities of the users who defined the keyword tags). For example, if a particular media content event of interest has been recorded in the DVR, the user keyword tag search application 100 may search the keyword tags residing in the stored media content event to identify any media content events that have been associated with the searched keyword tag(s). The return message 162 may then indicate to the user that the identified media content event has been stored into the DVR 124 and is available for presentation.

Figure 3:
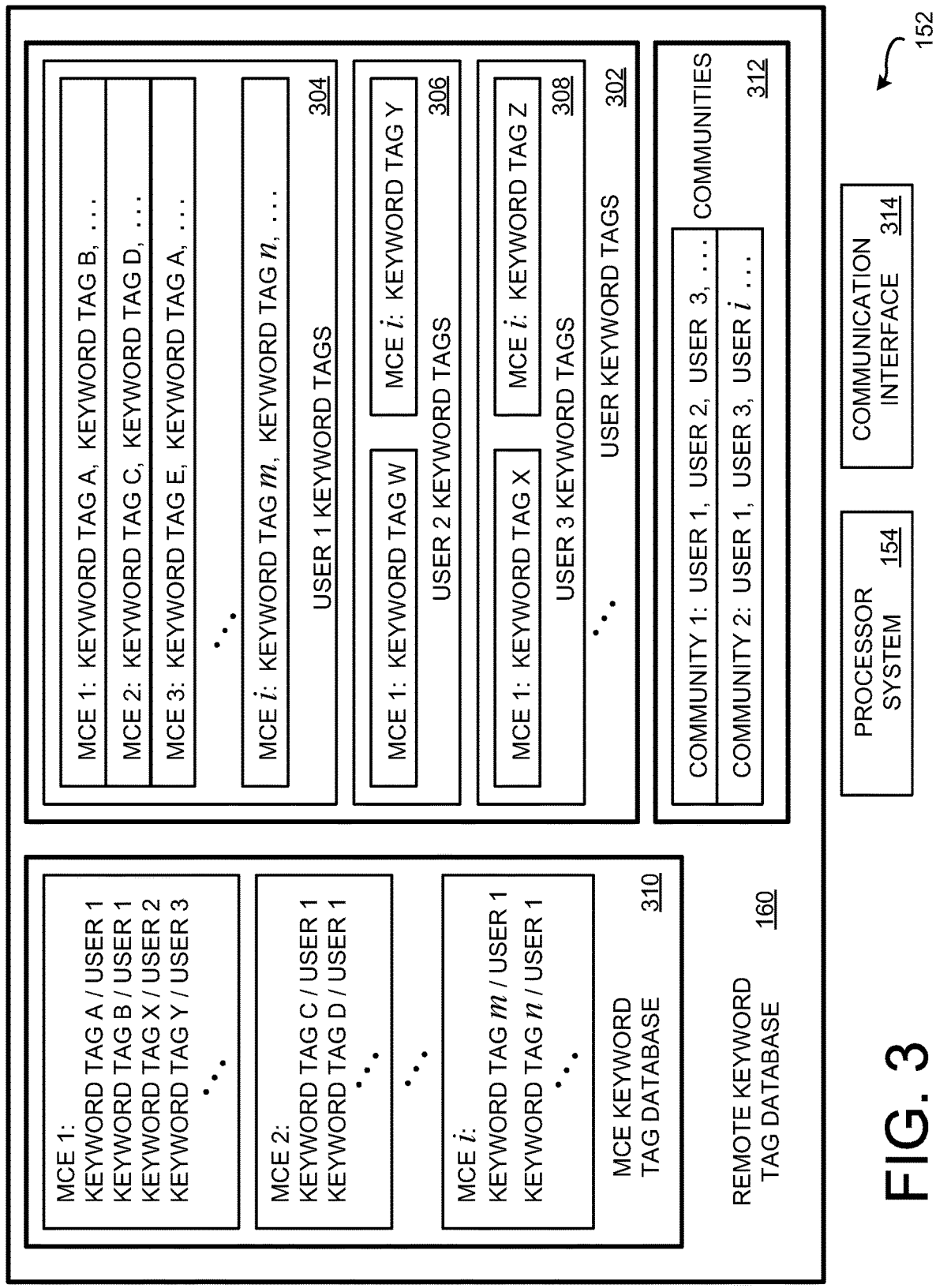
FIG. 3 is a block diagram illustrating in greater detail an example remote keyword tag database implemented in the remote keyword tag system.

FIG. 3 is a block diagram illustrating in greater detail an example remote keyword tag database 160 implemented in the remote keyword tag system 100. In the various embodiments, a plurality of media devices from time to time, or periodically, establish a communication link to the remote keyword tag server 152, via the communication network 150 (FIG. 1). A variety of different types of media devices may communicatively couple to the remote keyword tag server 152. These media devices communicate their user defined keyword tags and the identifying information of the associated media content event to the remote keyword tag server 152 over the established communication link. The remote keyword tag server 152 saves the received defined keyword tags and the identifying information of the associated media content event. Additionally, the identity of the users who defined the keyword tags and the identifying information of the associated media content event may be saved by the remote keyword tag server 152.

The media devices may periodically establish the communication link to the remote keyword tag server 152, such as daily, hourly, or another suitable time period. Additionally, or alternatively, the media devices may establish the communication link to the remote keyword tag server 152 when the user of the media device turns on or otherwise begins to use their media device, and/or when the user turns off or has finished using their media device. Additionally, or alternatively, the media devices may establish the communication link to the remote keyword tag server 152 when the user has defined one or more keyword tags and the identifying information of the associated media content event using their media device.

Some embodiments of the user keyword tag search application 100 are configured to have the remote keyword tag server 152 initiate establishment of the communication link to one or more of the media devices. For example, a list of media devices may be maintained by the remote keyword tag server 152. From time to time, or periodically, the remote keyword tag server 152 may establish the communicating link to these media devices. Once the remote keyword tag server 152 has established the communication link to one of the media devices, a request is communicated from the remote keyword tag server 152 to the media device. The request is for any user defined keyword tags and the identifying information of the associated media content event that have been defined by the user of that media device. In response to receiving the request, the media device communicates any defined keyword tags and the identifying information of the associated media content event to the remote keyword tag server 152.

The received defined keyword tags and the identifying information of the associated media content event provided by the plurality of media devices may be stored in a variety of manners and/or configurations by the remote keyword tag server 152. In an example embodiment, a listing of media content events that have one or more associated keyword tags, on a user by user basis, is maintained in the user keyword tags 302 portion of the remote keyword tag database 160. Thus, when the media device of a particular user provides defined keyword tags and the identifying information of the associated media content event to the remote keyword tag server 152, the information for that user is stored.

For example, user 1 (using the media device 102 of FIGS. 1 and 2) has defined keyword tag A and keyword tag B for MCE 1, keyword tag C and keyword tag D for MCE 2, keyword tag E and keyword tag A for MCE 3, and keyword tag m and keyword tag n for MCE 1. This information is stored in the user 1 keyword tags 304 portion of the user keyword tags 302.

User 2 (using their respective media device) has defined keyword tag W for MCE 1 and keyword tag Y for MCE 1. This information is stored in the user 2 keyword tags 306 portion of the user keyword tags 302. User 3 (using their respective media device) has defined keyword tag X for MCE 1 and keyword tag Z for MCE 1. This information is stored in the user 3 keyword tags 308 portion of the user keyword tags 302.

In an example embodiment, the above-described keyword tags and information identifying the associated media content events on a user by user basis are provided to other media devices. For example, the media device 102 may update the received information for users 2 and 3 into its keyword tag database 134.

Alternatively, the user of the media device 102 may be interested in keyword tags and the identifying information of the associated media content event that have been defined by other users of interest. For example, but not limited to, the user of the media device 102 may be a friend with, or an associate of, user 2. The user 1 may operate the resident user keyword tag search application 100 on their media device 102 to generate and transmit a request to the remote keyword tag server 152 for keyword tags and the identifying information of the associated media content event that have been defined by user 2. In response to receiving the request, the resident user keyword tag search application 100 of the remote keyword tag server 152 communicates the stored keyword tags and the identifying information of the associated media content event defined by user 2. When received at the media device 102, this information is then saved into the other user keyword tags 204 portion of the keyword tag database 134. Additionally, or alternatively, the return message 162 (FIG. 1) may be presented to the user indicating the identified media content events and/or the associated keyword tags that have been defined by the user 2.

Additionally, or alternatively, information for the user defined keyword tags and the identifying information of the associated media content event may be stored at the remote keyword tag server 152 according to an identifier of a particular media content event. For example, keyword tags for MCE 1 have been previously defined by a plurality of different users using their respective media devices. For example, user 1 has defined keyword tag A and keyword tag B, and has associated both, with MCE 1 using their media device 102. User 2 has defined keyword tag X and user 3 had defined keyword tag Y with MCE 1 using their respective media devices. This information has been stored into the MCE keyword tag data base 310 portion of the remote keyword tag database 160 maintained by the remote keyword tag server 152.

In an example embodiment, the above-described keyword tags and information identifying the associated media content events on a MCE by MCE basis are provided to other media devices. For example, the media device 102 may update the received information for MCE 1, MCE 2, and MCE 1 into its keyword tag database 134.

In some situations, the user of the media device 102 may be interested in identifying media content events using keyword tags that have been defined by other users of interest. For example, but not limited to, the user of the media device 102 may be interested in viewing keyword tags that have been defined for MCE1. The user 1 may operate the resident user keyword tag search application 100 on their media device 102 to generate and transmit a request to the remote keyword tag server 152 for keyword tags and the identifying information of the associated media content event that have been defined for MCE 1. In response to receiving the request, the resident user keyword tag search application 100 of the remote keyword tag server 152 communicates the stored keyword tags and the identifying information for the MCE 1. When received at the media device 102, this information is then saved into the keyword tag database 134. Additionally, or alternatively, the return message 162 (FIG. 1) may be presented to the user indicating the received keyword tags and identifying information.

On occasion, communities of users having similar interests may develop. The member users of a particular community may have devised a commonly shared set of keyword tags. For example, a community of users may be interested recipes for cooking sea bass. Such users may form and/or join a "sea bass recipe" community. They may all understand that a keyword tag "#seabassrecepie" is commonly used among all member users to search and locate media content events related to cooking sea bass. In the event that a media content event associated with cooking sea bass is discovered by one of the member users, that member user may associate the keyword tag "#seabassrecepie" with that media content event. The associated keyword tag "#seabassrecepie" and identifying information of the associated media content event may then be provided to the remote keyword tag server 152 for saving into the remote keyword tag database 160.

An example embodiment maintains a listing of member users for each of the defined communities in the communities portion 312 of the remote keyword tag database 160. In some embodiments, an individual may be required to sign up to become a member user of a particular community (such as by specifying a user name and/or password, and/or by paying a membership fee). When a newly identified media content event and/or a newly defined keyword tag is received by the remote keyword tag server 152, the information may be automatically communicated to the other member users of that particular community. For example, "Community 1" includes as members user 1, user 2 and user 3. "Community 2" includes as members user 1, user 3 and user i.

In some embodiments, a member user may request information from the remote keyword tag server 152 that identifies the other members of that community. The user operates the user keyword tag search application 100 residing on their media device to generate and communicate the request to the remote keyword tag server 152. For example, user 1 may be interested in learning who are other member users of Community 1. The remote keyword tag server 152, in response to the request of user 1, returns information identifying user 2 and user 3 (and other member users), which may then be shown in a suitable return message 162.

Optionally, supplemental information associated with member users of a community may be provided to requesting member users. For example, but not limited to, contact information such as a telephone number, mailing address, and/or e-mail address may be provided and shown in the return message 162. Any suitable information of interest about member users may be maintained in the communities 312 portion of the remote keyword tag server 152 database 160. The maintained supplemental information may also be used for other purposes, such as marketing, research or the like. Messages may be communicated between member users. Messages may be posted for general access by all member users. Recommendations for media content events or other resources may be made available to the member users.

The user defined user keyword tags 302, the MCE keyword tag database 310, and/or the communities 312 are illustrated as separate portions of remote keyword tag database 160. In other embodiments, the information in the remote keyword tag database 160 may be implemented using any suitable relational database or other database format. When a search is conducted by embodiments of the user keyword tag search application 100, one or more user specified keyword tags are compared with stored keyword tags in the remote keyword tag database 160. When a match is identified between the user specified keyword tag and a stored keyword tag in the remote keyword tag database 160, the associated identity information of the media content event may be retrieved using the matched keyword tag in the remote keyword tag database 160. The identity information of the media content event may then be used for a variety of purposes.

The remote keyword tag server 152 also includes a communication interface 314 that is configured to communicatively couple to the communication network 150 (FIG. 1). Communication links can them be established to a plurality of different media devices 102 and/or a plurality of different electronic devices so as to provide access to the remote keyword tag database 160.

Figures 4, 5:
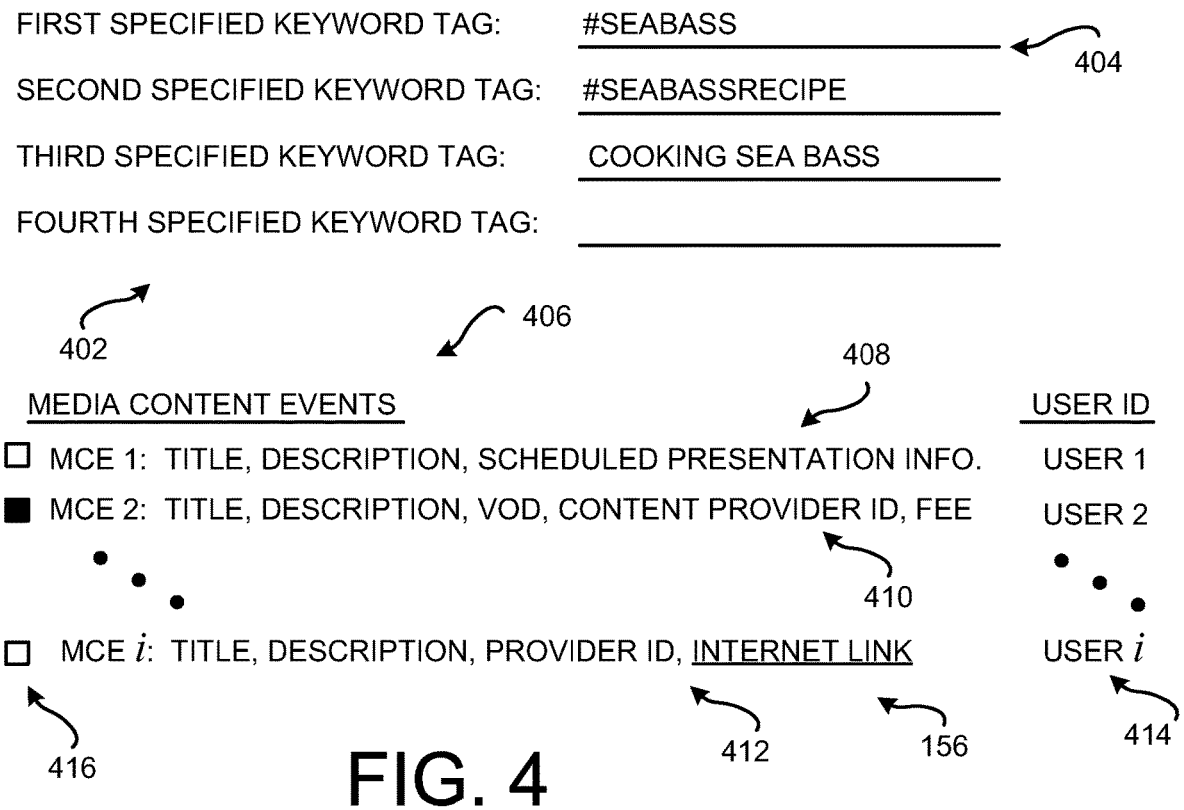
FIG. 4 is an illustration of an exemplary return message that may be presented to the user to indicate information about media content events identified during a keyword tag search.
FIG. 5 is an illustration of an exemplary EPG selection page wherein the user inputs keyword tags for selected media content events.

FIG. 4 is an illustration of an exemplary return message 162 that may be presented to the user to indicate information about media content events identified during a keyword tag search. In the simplified example return message 162, three keyword tags 402 have been identified:

seabass,
seabassrecipe, and
cooking sea bass.

In some embodiments, the hash tag symbol "#" indicates to the user keyword tag search application 100 that the following text string is to be searched (and/or the entirety of the keyword tag that includes the # symbol). In some embodiments, the hash tag is not used, or another symbol may be used. Further, text character delineators, such as spaces or the like may be used in the keyword tag. Any number of keyword tags may be used in the various embodiments.

In some embodiments, the return message 162 may also be used as an input GUI for user specification of one or more keyword tags. Here, an input region 404 (shown using an underlined space) may be provided to the user to add the text of a keyword tag. For example, the fourth keyword tag is illustrated as being blank. The user could operate their remote control 144, key board, gaming console, smart phone or other user input device to specify a fourth keyword tag. Then an additional search would be performed using the newly entered keyword tag (in addition to the existing first three keyword tags). Alternatively, or additionally, the user could revise one or more of the existing first three keyword tags for another search.

A listing 406 of identified media content events are presented on the return message 162. These media content events, in the example return message 162, were identified based on the above-described three keyword tags that formed the basis of the search performed by the user keyword tag search application 100.

Various information may be indicated with the listed media content events. For example, the first identified media content event MCE 1 408 indicates the title, a description, and scheduled presentation information (such as the date, times, and channel for the scheduled presentation of MCE 1). The second identified media content event MCE 2 410 indicates the title and a description. Further, MCE 2 is indicated as being available on a VOD system that is available on demand from the indicated content provider. If a fee is required to access MCE 2, the access fee may also be indicated. The last one of the indicated media content events, MCE i 412, is indicated as being available from an Internet site. The identity of the provider and internet link information is provided. The link information may be hot, such that upon selection by the user, the link is automatically established between the media device 102 and the identified Internet site. The, the media content event MCE i is automatically accessed and presented (or recorded).

Optionally, the user who initially defined the keyword tag that resulted in identification of the media content events may be listed in the region 414 of the return message 162. For example, "User 2" is shown as being associated with the second media content event MCE 2. Additionally, the keyword tag defined by User 2 may also be shown. This information may be selectable by the user of the media device 102. For example, the identity of the users (and optionally their defined keyword tag s) may be initially omitted from the return message 162. Then, the user may request presentation of the identity of the users if the user of the media device 102 is interested in this information.

In some embodiments, a selection box 416 or the like is available for selection by the user to cause an operation of the media device 102 with respect to the selected media content event. The user may use the remote control 146 or another suitable input device to navigate to selection boxes 416 associated with media content events that are of interest to the user. Upon selection of one or more of the selection boxes 416, the media device 102 performs an operation related to the selected media content event of interest. For example, the selected media content event of interest may be accessed and presented if it is available in the received media content stream 104, if it is available on demand, and/or if it has been stored in the DVR 124 (FIG. 1). Alternatively, or additionally, a scheduled recording of the selected media content event of interest may be defined by the media device 102 so that the selected media content event of interest is recorded when received in the media content stream 104. Alternatively, or additionally, selection may result in presentation of further supplemental information associated with the selected media content event of interest, such as a more detailed description of the subject matter, a listing of actors or other individuals associated with the selected media content event of interest, a set location, a production date, or the like. Alternatively, or additionally, a reminder or the like may be set such that when the selected media content event of interest becomes available, a reminder is presented to the user. Alternatively, or additionally, suggested alternative locations for the selected media content event of interest may be indicated to the user. For example, the selected media content event of interest may be available at some future date, but may alternatively be immediately available from a VOD system, a digital video disc (DVD) outlet, and/or from an Internet provider. Alternatively, or additionally, similar and/or related media content events may be suggested to the user, and/or a recommendation list or the like may be presented to the user.

Any number of media content events may be indicated by the return message 162. Additional pages may be used for the return message 162 if there is not sufficient room on the display 112 (FIG. 1) for presentation of the listed media content events on a single page.

Embodiments of the user keyword tag search application 100 may perform filtering and/or sorting of indicated media content events that have been identified as being associated with specified keyword tags. For example, a listing of a plurality of identified media content events may be ordered by most recently available media content events.

Alternatively, or additionally, filtering and/or sorting may be based on access fees for identified media content events. For example, free identified media content events may be listed first, and fee-based identified media content events may be listed later or even omitted.

Alternatively, or additionally, filtering and/or sorting may be based on the number of associated keyword tags. For example, media content events having the most keyword tags may be listed first, and media content events with fewer keyword tags may be listed later or even omitted.

Alternatively, or additionally, filtering and/or sorting may be based on availability locations of the identified media content events. For example, broadcasted and/or recorded media content events may be listed first, and VOD media content events may be listed later or even omitted.

Alternatively, or additionally, filtering and/or sorting may be based on a recommendation list that is defined using recommendations of other users. For example, recommended media content events may be listed first, while non-recommended media content events may be listed later or even omitted.

In some embodiments, the user may specify one or more keyword tags to the user keyword tag search application 100. The user keyword tag search application 100 may monitor various resources, such as EPG updates, Internet sites, DVD providers, VOD providers, and/or other sources of media content to determine availability of any media content events have been associated with the specified one or more keyword tags. In the event that an associated media content event is identified as becoming available, then the return message 162 may be automatically presented to the user indicating that an associated media content event has been identified, and where the identified media content event can be accessed at. These type of return messages 162, or automatic alerts, may be presented when the user initially begins to use their media device 102, when the user has finished using their media device, and/or when the user requests the return message 162.

FIG. 5 is an illustration of an exemplary EPG selection page 502 wherein the user inputs keyword tags for selected media content events that are used to identify one or more media content events indicated on a presented portion of the EPG selection page 502. For example, the media content event "Program A-1" being broadcast by "Station A" starting at 8:00 p.m. indicates that the "keyword tag A" has been associated with this particular media content event. Thus, the user intuitively appreciates that they can later locate this particular identified media content event using the indicated keyword tag.

In some embodiments, the user may specify one or more keyword tags. If the user keyword tag search application 100 identifies one or more media content events that have been associated with the specified keyword tag, those identified media content events may be indicated on the presented portion of the EPG selection page 502. Once the media content event has been indicated on the EPG selection page 502, the user may navigate to that particular identified media content event, and the select the identified media content event for presentation and/or for recording.

For example, the user has entered in the keyword tag "#seabass" in the input region 504 on the EPG selection page 502. The search results performed by the user keyword tag search application 100 has identified that "Program E-1" is associated with the specified keyword tag. When this program is indicated on the presented portion of the EPG selection page 502, the block 506 identifying this program is highlighted so that the user intuitively appreciates that this particular media content event has been associated with the specified keyword tag. Here, the block 506 is shown with a bold border and the descriptive text is presented using a bold font. Any suitable highlighting of the block 506 may be used, such as a text font color, a fill color, a fill pattern, or even flashing or the like.

In some situations, the user may not have a media device that is provisioned with an embodiment of the user keyword tag search application 100, or the resident user keyword tag search application 100 may not have a search function. Here, the media device establishes a communication link to the remote keyword tag server 152. The user may then access the remote keyword tag server 152 and input one or more keyword tags. The media device can then generate and communicate a request for a search using the user defined one or more keyword tags to the remote keyword tag server 152. The user keyword tag search application 100 residing in the remote keyword tag server 152 then performs the search identifying information of the associated media content event may then be communicated back to the requesting media device. A suitable return message 162 (FIG. 4) or EPG selection page 502 (FIG. 5) may then be presented to the user.

In some situations, there may be multiple users of the same media device 102. The multiple users may have unique user identifiers (IDs), such as a user name and/or password, to differentiate themselves as individual users of the same media device 102. Some embodiments of the user keyword tag search application 100 separately maintain lists of specified keyword tags and/or keyword tag search results for individual users.

In embodiments of the user keyword tag search application 100 that store and maintain databases of keyword tags and/or keyword tag search results, these embodiments may be optionally configured to permit a user to modify such databases. For example, a user may view a list of keyword tags stored in the keyword tag database 134, and then delete selected keyword tags that are no longer of interest to the user. Further, these changes may then be communicated to the remote keyword tag server 152 so that the remote keyword tag database 160 is updated accordingly.

In some situations, the user may, from time to time, use a different media device or electronic device. The user may use the different media device or electronic device to define one or more keyword tags and/or associated a media content event of interest with a particular keyword tag(s). When a link is established from the other media device or electronic device to the remote keyword tag server 152, these defined keyword tags and the identifying information of the associated media content event are stored by the remote keyword tag server 152 and/or are communicated to the media device 102. Alternatively, or additionally, a link may be established from the other media device or electronic device to the media device 102. Then, these defined keyword tags and the identifying information of the associated media content event are directly communicated and then are stored by the media device 102. Accordingly, the user may use different media devices or electronic devices to define keyword tags and/or to identify associated media content event of interest, and then have the user defined keyword tags 202 of the keyword database 134 updated with the information.

In some embodiments, a suitable return message 162 may be generated by the media device 102 and then communicated to the remote electronic device for presentation on a display of the electronic device and/or on a display communicatively coupled to the remote electronic device. For example, the user may be at a DVD outlet. A search request with one or more keyword tags could be communicated from their electronic device, such as a cell phone, smart phone, note pad or the like, to their media device 102. The user keyword tag search application 100 could the conduct a search and return a suitable return message 162 that is presented to the user at the DVD outlet.

It should be emphasized that the above-described embodiments of the user keyword tag search application 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for identifying media content events, the method comprising:

receiving, at a media device, a first user specification of a user defined keyword tag;

associating an identifier of a media content event with the user defined keyword tag specified in the first user specification;

storing the initially received user defined keyword tag and the associated identifier of the media content event in a database configured to store a plurality of other keyword tags and their respective associated identifier of at least one media content event;

receiving electronic program guide (EPG) information at the media device from a media content provider that provides broadcasting media content to the media device;

storing the received EPG information in a memory medium of the media device;

generating an electronic program guide (EPG) based on the stored EPG information;

presenting the EPG on a display that is communicatively coupled to the media device,
  wherein the presented EPG lists a plurality of stations that are currently broadcasting media content via the media content provider,
  wherein, for each of the listed plurality of stations, an identifier of a currently broadcasting media content event by that station is indicated on the presented EPG;
  wherein the presented EPG further presents identifiers of other media content events that are scheduled for future broadcast at least for a duration of time that includes the current time out to a future time;

wherein the user defined keyword tag is presented concurrently with and adjacent to the identifier of the listed currently broadcasting media content event on the presented EPG when the associated media content event is currently being broadcast by the associated station;

receiving a second user specification of the user via the presented EPG, wherein the second user specification corresponds to a request of presentation of the currently broadcasting media content event that also indicates the user defined keyword tag on the presented EPG, wherein the second user specification is received after the first user specification; and presenting the currently broadcasting media content event associated with the second user specification made via the presented EPG to a first user;

establishing a communication link from the media device to at least one remote electronic device; and receiving, from the at least one remote electronic device via the communication link, information that identifies a plurality of second users associated with a community of users, wherein the first user is also a member of the community of users who are associated with each other through the user defined keyword tag, wherein a return message that is presented to the first user indicates the identity information for the plurality of second users who are associated with the user defined keyword tag, and wherein the return message indicates, for at least one of the plurality of second users, at least one second user defined keyword tag that has been defined by that second user and an identifier of another media content event that has been associated with that second user defined keyword tag.

2. The method of claim 1, after receiving the second user specification, the method further comprising:

receiving a third user specification;

searching information in the electronic program guide (EPG) information stored at the media device to identify schedule information for a future broadcast of another media content event that is also associated with the user defined keyword tag, wherein the EPG information is searched in response to receiving the third user specification; and scheduling a recording of the other media content event associated with the user defined keyword tag in response to identifying the scheduled broadcast of the other media content event, wherein the scheduled recording of the other media content event is based on the schedule information in the EPG information.

3. The method of claim 1, after receiving the second user specification, the method further comprising:

receiving a third user specification;

searching information in the electronic program guide (EPG) information to identify schedule information for a future broadcast of another media content event that is also associated with the user defined keyword tag, wherein the EPG information is searched in response to receiving the third user specification; and presenting a portion of the EPG to the user, wherein the presented portion of the EPG indicates a second station that is scheduled to broadcast the media content event associated with the user defined keyword tag, and wherein the presented portion of the EPG indicates an identifier of the listed other broadcasting media content event, and wherein the presented portion of the EPG concurrently indicates the scheduled broadcast time of the other media content event and the user defined keyword tag.

4. The method of claim 1, after receiving the second user specification, and wherein the currently broadcasting media content event identified by the second user specification is a first media content event, the method further comprising:

receiving a third user specification that identifies a second media content event that is indicated on the presented EPG, wherein the second media content event is scheduled for broadcast at a future time, and wherein the identifier of the second media content event and the second user specification are concurrently indicated on the EPG; and presenting the second media content event associated with the user defined keyword tag of the second user specification when the second media content event is broadcast at the future time in response to receiving the third user specification.

5. The method of claim 1, after receiving the second user specification, and wherein the media content event associated with the user defined keyword tag of the second user specification is also available on a video on demand (VOD) system, the method further comprising:

receiving a third user specification; and accessing the media content event associated with the user defined keyword tag of the second user specification from the VOD system in response to receiving the third user specification.

6. The method of claim 1, after receiving the second user specification, and wherein the media content event associated with the user defined keyword tag of the second user specification is available from an Internet site identified in a return message that is presented to the user, the method further comprising:

receiving a third user specification;

establishing a communication link from the media device to the Internet site in response to receiving the third user specification; and receiving, at the media device, the media content event associated with the user defined keyword tag of the second user specification from the Internet site.

7. A media device, comprising:

a media content stream interface that receives a media content stream, wherein the media content stream includes a plurality of media content events;

a memory medium communicatively coupled to the media content stream interface wherein the memory medium stores a database comprising:

a plurality of user defined keyword tags;

a plurality of identifiers each identifying a media content event, wherein each of the plurality of media content event identifiers are associated with at least one of the plurality of user defined keyword tags; and wherein the memory medium stores electronic program guide (EPG) information;

a user input interface that:

receives a first user specification of at least one user defined keyword tag from a user of the media device, wherein the user defined keyword tag is associated with at least one of the plurality of media content event identifiers; and receives a second user specification, wherein the second user specification is received after the first user specification is received and after the user defined keyword tag of the first user specification is associated with the media content event identifier;
a processor system communicatively coupled to the memory medium, the user input interface and the media content stream interface, wherein the processor system:
generates an electronic program guide (EPG) based on the stored EPG information;
presents the generated EPG on a display that is communicatively coupled to the media device,
wherein the presented EPG lists a plurality of stations that are currently broadcasting media content via the media content provider,
wherein, for each of the listed plurality of stations, an identifier of a currently broadcasting media content event by that station is indicated on the presented EPG,
wherein the presented EPG further presents identifiers of other media content events that are scheduled for future broadcast at least for a duration of time that includes the current time out to a future time,
wherein the user defined keyword tag is presented concurrently with and adjacent to the identifier of the listed currently broadcasting media content event on the presented EPG when the associated media content event is currently being broadcast by the associated station, and
wherein the second user specification is made via the presented EPG and corresponds to a request of presentation of the currently broadcasting media content event that also indicates the user defined keyword tag; and
presents the currently broadcasting media content event associated with the second user specification made via the presented EPG to a first user;
establishes a communication link from the user input interface to at least one remote electronic device; and
receives, from the at least one remote electronic device via the communication link, information that identifies a plurality of second users associated with a community of users, wherein the first user is also a member of the community of users who are associated with each other through the user defined keyword tag,
wherein a return message that is presented to the first user indicates the identity information for the plurality of second users who are associated with the user defined keyword tag, and
wherein the return message indicates, for at least one of the plurality of second users, at least one second user defined keyword tag that has been defined by that second user and an identifier of another media content event that has been associated with that second user defined keyword tag.

8. The media device of claim 7, further comprising:
a digital video recorder (DVR) memory medium communicatively coupled to the processor system, wherein the memory medium stores selected ones of the plurality of media content events,
wherein a return message that is presented to the user on the display indicates to the user that stored in the DVR is at least one of the stored media content events that has been identified as being associated with the input at least one user defined keyword tag, and
wherein the processor system retrieves the stored identified media content event for presentation in response to receiving, at the user input interface, a user selection that specifies presentation of the stored media content event.

9. The media device of claim 7, further comprising:
a communication interface communicatively coupled to the processor system and a communication network,
wherein a return message that is presented to the user on the display indicates to the user that stored at an Internet site is at least one of the media content events identified as being associated with the input at least one user defined keyword tag, and
wherein the processor system retrieves from the Internet site the stored identified media content event for presentation in response to receiving at the user input interface a user selection that specifies presentation of the stored media content event.

10. The media device of claim 7, wherein the memory medium stores electronic program guide (EPG) information that defines scheduled presentation dates and times for selected ones of the plurality of media content events that are to be received at the media content stream interface at a current time and at future times, wherein the processor system:
searches the EPG information for instances where another media content event is identified as being associated with the input at least one user defined keyword tag, wherein the other media content event is scheduled for future presentation;
indicates in a return message that is presented to the user on the display that the other media content event associated with the input at least one user defined keyword tag is scheduled for future presentation; and
schedules a recording of the other media content event in response to receiving at the user input interface a user selection that specifies recording of the media content event, wherein the recording schedule is based on the EPG information.

11. The media device of claim 7, further comprising:
a communication interface communicatively coupled to the processor system and a communication network,
wherein the processor system:
establishes a communication link from the media device to at least one remote electronic device, and
communicates to a remote keyword tag system residing in the at least one remote electronic device, via the established communication link, the plurality of user defined keyword tags, the plurality of media content event identifiers associated with each one of the user defined keyword tags, and information that identifies the user of the media device.

* * * * *